US008565961B2

(12) United States Patent
Takeda

(10) Patent No.: US 8,565,961 B2
(45) Date of Patent: Oct. 22, 2013

(54) VEHICULAR DATA RECORDING APPARATUS

(75) Inventor: Toshihiko Takeda, Chiryu (JP)

(73) Assignee: Denso Corporation, Kariya (JP)

(*) Notice: Subject to any disclaimer, the term of this patent is extended or adjusted under 35 U.S.C. 154(b) by 65 days.

(21) Appl. No.: 13/275,605

(22) Filed: Oct. 18, 2011

(65) Prior Publication Data

US 2012/0197481 A1  Aug. 2, 2012

(30) Foreign Application Priority Data

Jan. 27, 2011  (JP) .................... 2011-15415

(51) Int. Cl.
G01M 17/00 (2006.01)
G06F 7/00 (2006.01)
G06F 19/00 (2011.01)

(52) U.S. Cl.
USPC ........................ 701/32.2; 701/31.4

(58) Field of Classification Search
USPC .............................. 701/32.2, 31.4
See application file for complete search history.

(56) References Cited

U.S. PATENT DOCUMENTS 4,638,289 A * 1/1987 Zottnik .......................... 246/45
5,446,659 A * 8/1995 Yamawaki .................. 701/32.2
8,081,643 B2 * 12/2011 Sonoda et al. ............... 370/401
2006/0276947 A1 * 12/2006 Kaita et al. ..................... 701/48
2007/0135980 A1 * 6/2007 Plante ............................. 701/35
2009/0262000 A1 * 10/2009 Kanazawa et al. ........... 341/176

FOREIGN PATENT DOCUMENTS

| JP | 09160602 A | * | 6/1997 |
| JP | 2005-265454 | | 9/2005 |
| JP | 2006-193017 | | 7/2006 |
| JP | 2009-3685 | | 1/2009 |

OTHER PUBLICATIONS

Machine Translation of JP 09160602 A, Jun. 1997.*

* cited by examiner

Primary Examiner — Mary Cheung
Assistant Examiner — Frederick Brushaber
(74) Attorney, Agent, or Firm — Nixon & Vanderhye P.C.

(57) ABSTRACT

Each of a plurality of electronic control units (i.e., ECUs) of a vehicle control system has a memory for recording data regarding a system operation condition of the vehicle control system. When one of the ECUs detects an occurrence of a predetermined abnormal event, that ECU records data regarding the system operation condition of the vehicle control system, which is held by that ECU, in the memory of that ECU. Further, the detecting ECU notifies the other ECUs of the occurrence of the predetermined abnormal event. Accordingly, each of the remaining ECUs records data regarding the system operation condition of the vehicle control system held by each of them to its memory. In such manner, even if multiple ECUs are installed as the vehicle control system, a vehicular data recording apparatus is enabled to record required data at a time of occurrence of a predetermined event.

10 Claims, 5 Drawing Sheets

VEHICULAR DATA RECORDING APPARATUS

CROSS REFERENCE TO RELATED APPLICATION

The present application is based on and claims the benefit of priority of Japanese Patent Application No. 2011-15415, filed on Jan. 27, 2011, the disclosure of which is incorporated herein by reference.

TECHNICAL FIELD

The present disclosure generally relates to a vehicular data recording apparatus recording data regarding the system operation conditions of an in-vehicle control system controlling a vehicle at the time of predetermined event occurrence.

BACKGROUND

Conventionally, as disclosed in Japanese Patent Laid-Open No. 2009-3685 (JP '685), a data recording apparatus for recording data that represents a system operation condition of a system when an event occurrence of the system triggers the recording of the data. The data recording apparatus is equipped with an analysis object data temporary save unit for storing analysis object data for a recent period of a predetermined time length or for a predetermined number of data acquisition times; an event occurrence determination unit for determining an occurrence of an event based on event occurrence determination data; and a data storage unit for storing the data stored in the analysis object data temporary save unit in association with an event data after a predetermined time period from the determination of the occurrence of the event.

As described above, due to the storage of the event data in association with the analysis object data, the device in JP '685 enables event analysis of a complicated event by using various event factors such as an event type, an event source, an event condition, and the like. Further, because event data itself is associated with the analysis object data for the distinction of event factors, the stored amount of data is decreased to use only a small area of a memory.

The data recording apparatus in JP '685 is configured to have only one electronic control unit (ECU) to provide an analysis object data temporary save unit, an event occurrence determination unit, and as well as a data storage unit, for storing, in the memory, the analysis object data generated during a predetermined period before and after the occurrence of an event. Therefore, when the detection of the occurrence of the event and the storage of the analysis object data are performed by only one electronic control unit, the required data is successfully stored.

However, for example, an in-vehicle control system controlling a travel condition of a hybrid vehicle has various devices under its control, such as an engine, a motor, brakes, a transmission, a steering, a battery, and the like. Therefore, multiple electronic control units are installed in a vehicle for controlling the devices, and each of the devices may be controlled under cooperative operation of the multiple electronic control units.

When multiple electronic control units are installed in such manner, the data which should be recorded at the time of the occurrence of an event may exist in a dispersed manner in those electronic control units. Therefore, even when the occurrence of an event is detected in one of the electronic control units, the recordation of all of the required data at the time of such occurrence of an event may be difficult.

SUMMARY

In an aspect of the present invention, the vehicular data recording apparatus for recording, at a time of occurrence of a certain event, a system operation condition data that is related to a system operation condition of a vehicle control system that controls a vehicle, the apparatus includes: a recorder in each of a plurality of electronic control units (ECUs) in the vehicle control system, the ECUs are communicably coupled to each other, and, when at least one of the ECUs detects an occurrence of an event, a detecting ECU, which detected the occurrence of the event, records a data held by the detecting ECU that is related to the system operation condition of the vehicle control system in the recorder of the detecting ECU, and the detecting ECU notifies the remaining ECUs of the occurrence of the event, and each of the remaining ECUs, respectively, at least records a data held by the remaining ECUs that is related to the system operation condition of the vehicle control system in the recorder of the remaining ECUs.

According to the apparatus described above, when the data required to be recorded exists dispersed in each of the ECUs, the required data is fully recorded in the recorder of each of the ECUs, without fail (i.e., without losing any of the required data). Further, the apparatus described above finishes data recording operation at an earlier timing in comparison to a conventional apparatus that transmits, in response to the notification, the related data held in each of the ECUs to one of the ECUs to record such data. Further, the apparatus reduces the amount of transmitted data in comparison to the conventional apparatus.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A vehicular data recording apparatus in an embodiment of the present disclosure is explained in the following with reference to the drawings. In the present embodiment, an application of the vehicular data recording apparatus to a hybrid vehicle having an engine and a motor as a driving power source of the vehicle is explained. However, the vehicular data recording apparatus of the present disclosure may be applicable to other vehicles such as an engine-driven vehicle or a motor-driven vehicle.

Figure 1:
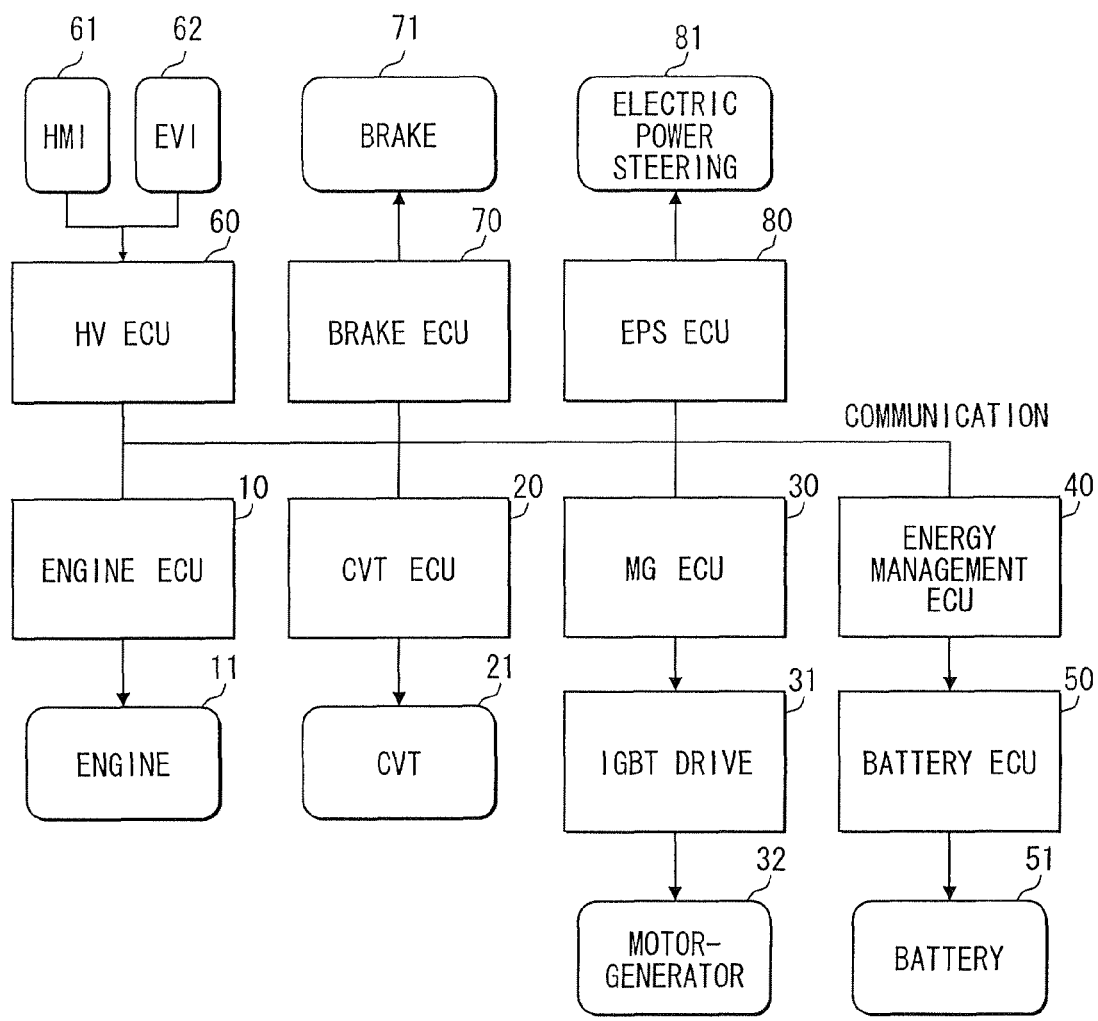
FIG. 1 is a block diagram of an in-vehicle control system controlling a hybrid vehicle having a vehicular data recording apparatus of the present disclosure.

With reference to FIG. 1, a system for controlling a hybrid vehicle includes an engine 11 and a motor generator (MG) 32 as power source to drive and operate the hybrid vehicle. The MG 32 is disposed on an output shaft of the engine 11 (not shown), and the output shaft of the engine 11 is coupled to a continuously variable transmission (CVT) 21.

The MG 32 is coupled to a battery 51 that provides the MG 32 with power to assist the engine 11 with operating the vehicle. Additionally, the MG 32 generates electricity to charge the battery 51 by using the rotational force of the tires when the vehicle decelerates. Furthermore, when a clutch (not shown) is provided between the engine 11 and the MG 32, the engine 11 and the MG 32 can be separated, and the vehicle may be driven only by the driving power from the MG 32.

The CVT 21 is a continuously variable transmission equipped with a forward backward switching mechanism, and a metal belt connection, which is well known in the arts, between an input shaft that is coupled to an output shaft of the engine 11 (not shown) and (b) an output shaft that is coupled to the drive shaft through a main clutch (not shown) that provides a smooth start of the vehicle. In other words, for example, the CVT 21 changes a pulley width on the input shaft and a pulley width on the output shaft by oil pressure for adjusting a winding radius of the metal belt on those shafts, for continuously changing the gear ratio. The CVT 21 may be replaced with an automatic transmission having predetermined multiple gear ratios.

Though the above disclosure is in regards to a hybrid system of so-called parallel method, it should be understood to one skilled in the art that a hybrid system of other methods, such as a split method, a series parallel, or the like, may be used.

A brake system (BRK) 71 generates braking force by using a fluid pressure or by using an electric motor. An electric power steering system (EPS) 81 assists a driver with the turning or operation of a steering wheel by using an electric motor.

A human machine interface (HMI) 61 is an operation unit operated by a driver of the hybrid vehicle for the purpose of controlling the vehicle, and the operation unit may correspond to an accelerator pedal, a brake pedal, a steering wheel, a shift lever, and the like. The frequency at which the operation unit is used is detected by sensors and is inputted to a hybrid (HV) ECU 60. The detection signal from a sensor may also be inputted to other ECUs, An environment vehicle interface (EVI) 62 is a device that acquires environment information of the vehicle, such as a radar device and/or camera for detecting and capturing images of a leading vehicle and/or obstacles. When the environment information is acquired, the information may be utilized for adaptive cruise control for following a leading vehicle, a lane keep control for traveling within a lane width based on a recognition of a white lane divider in the captured image, adjustment of steering assist force of an electric power steering (EPS) 81, and the like.

In the present embodiment, the control system of the hybrid vehicle may include an engine ECU 10, a CVT ECU 20, an MG ECU 30, an energy management ECU 40, a battery ECU 50, an HV ECU 60, a BRK ECU 70 and an EPS ECU 80. Multiple ECUs are installed and employed for controlling each of components such as the engine 11, the CVT 21, the MG 32 as described above. Communication between the ECUs may be performed through a well-known vehicle LAN, such as CAN, LIN, or the like.

Figure 2:
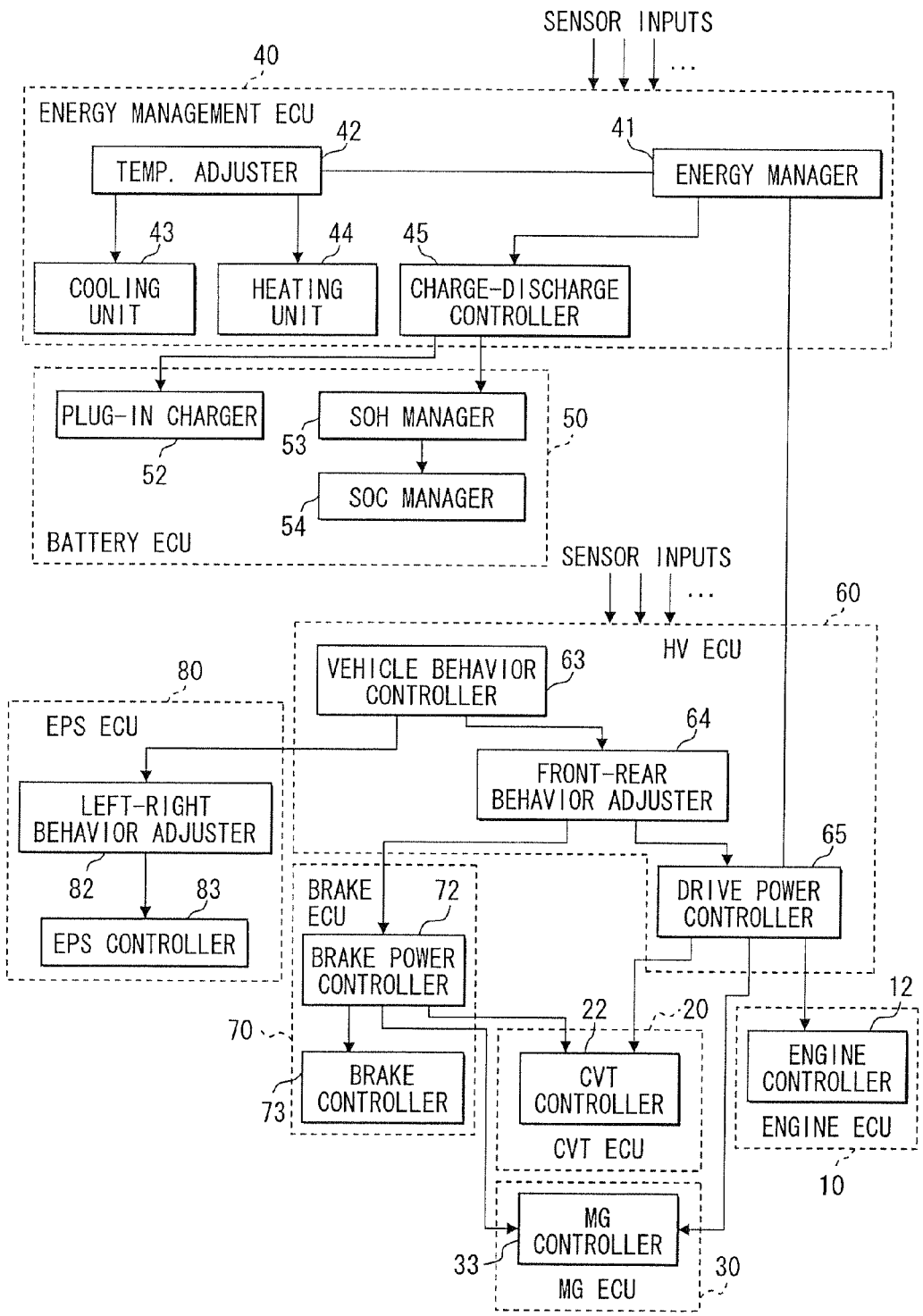
FIG. 2 is a block diagram of functional arrangement of a control system of the hybrid vehicle of FIG. 1.

With reference now including FIG. 2, a block diagram of a control system for controlling the vehicle by using multiple ECUs will now be described. The following functional description of each of the ECUS is for exemplary purpose only, and the function of the ECUs may be changed. Additionally, it should be apparent to one skilled in the arts that the engine 11 and CVT 21 may be controlled by a common ECU, and multiple ECUs may be unified when appropriate.

The energy management ECU 40 manages a total energy consumed in the vehicle to determine an efficient travel of the vehicle. Accordingly, an energy manager 41 manages the capacity of the battery 51 based on input information from various sensors, and the MG 32 calculates MG torque that can be generated based on the capacity of the battery 51.

In terms of the capacity management of the battery 51, the capacity of the battery 51 may vary depending on the change in temperature, or the battery 51 may be damaged when the temperature of the battery 51 is too high. Therefore, the energy manager 41 outputs a target battery temperature to a temperature adjuster 42. Based on the target battery temperature, the temperature adjuster 42 performs a temperature adjustment control of the battery 51 by using a cooling unit 43 to drive a cooling device for cooling the battery 51 or a heating unit 44 to drive a heating device for heating the battery 51.

The energy manager 41 detects a charge level that is a ratio of a charged quantity against a charge capacity of the battery 51, and outputs, to a charge-discharge controller 45 a charge-discharge instruction to prevent an excessive charging or an excessive discharging of the battery 51. According to the charge-discharge instruction, the charge-discharge controller 45 outputs a control signal to a plug-in charger 52 and an SOC (state of charge) controller 54 of the battery ECU 50 to maintain the charge level of the battery 51 within an appropriate range. In addition, because the charge capacity of the battery 51 may vary according to a deterioration condition (SOH) of the battery 51, the SOC controller 54 uses information from an SOH controller 53 for controlling the charge capacity of the battery 51.

The HV ECU 60 receives inputs from various sensors such as an accelerator sensor, a brake sensor, a shift position sensor, a steering sensor, and the like. Based on the inputted data, the HV ECU 60 controls the behavior of the vehicle to adapt to the operation by the driver. To stabilize the vehicle's behavior and to adapt to the operation of the vehicle driver, a vehicle behavior controller 63 outputs a target acceleration (or a target deceleration) in a front and rear direction to a front-rear behavior adjuster 64, and outputs a target acceleration in a right and left direction to a right-left behavior adjuster 81 in the EPS ECU 80.

To provide a given target acceleration in a front and rear direction the front-rear behavior adjuster 64 outputs a target driving torque to a drive power controller 65 of the HV ECU 60 and a target braking torque to a brake power controller 72 of the brake ECU 70. In order to provide an efficient driving torque, the drive power controller 65 takes into account the maximum MG torque of the MG 32, which is acquired from the energy manager 41, and determines a target engine torque for an engine controller 12, a target MG torque for the MG controller 33, and a target gear ratio for the CVT controller 22.

Based on information, such as the engine rotation number, the engine controller 12 controls the driving condition of the engine 11 by adjusting a throttle valve opening and the amount of fuel supplied to the engine 11 in order to provide an output of a required torque. Based on the rotation number or the rotation position of the MG 32, the MG controller 33 outputs to an IGBT drive circuit (i.e., an inverter circuit) 31, a drive signal to control the system operation condition of the MG 32, so that the MG 32 generates a target MG torque. The CVT controller 22 controls a gear ratio of CVT 21 to be closer to a target gear ratio so that a driving torque generated by the engine 11 and the MG 32 is adequately transmitted to a driving wheel.

In addition, to provide a target brake torque the brake power controller 72 determines a target brake torque for a brake controller 73, a target re-generation brake torque for the MG controller 33, and a target gear ratio for the CVT controller 22.

Based on information, such as a wheel speed and brake fluid pressure for each of the wheels, the brake controller 73 controls brake fluid pressure and driving condition of an electric motor in order to have the BRK 71 generate a target brake operation torque. The target brake operation torque is calculated to fill a gap between the target brake torque and the target re-generation brake torque, when the target re-generation brake torque is not sufficient or is smaller than the target brake torque. In such a case, the MG controller 33 controls the MG 32 to be serving as a dynamo (i.e., a generator), and, the electricity generated by the MG 32 is used to charge the battery 51.

Further, to provide a given target acceleration in a right and left direction a right-left behavior adjuster 82 outputs a target assist torque to an EPS controller 83. Based on information, such as a driving current of the electric motor, the EPS controller 83 operates the EPS 81 to generate a target assist torque.

As described above, the hybrid vehicle may be controlled by calculating a target torque of each of the engine 11 and the MG 32 in response to an acceleration request from a driver (i.e., a depression amount of an accelerator pedal) in the HV ECU 60, and by outputting the calculated torque to each of the ECUs 10, 30 controlling the engine 11 and the MG 32, respectively, which are a driving power source of the hybrid vehicle. Therefore, the torque for driving the hybrid vehicle is under control of multiple ECUs, thereby being susceptible to interference between those ECUs, which may cause abnormal behavior of the hybrid vehicle than a common (internal-combustion-only) vehicle.

In view of the above situation, data of the system operation condition of the vehicle control system is recorded in an event of abnormality of any kind. By way of example the following may be considered an event of abnormality: an abnormal operation may be a steep change of the accelerator depression amount and the brake depression amount; an abnormal vehicle behavior may be an abrupt acceleration, an abrupt slowdown or an abrupt stopping, a steep turn; as well as a change of the system operation such as an abrupt change of re-generation request. It is well-known in the arts that the recorded data may be analyzed to investigate the cause of such abnormality.

As described above and shown in FIGS. 1 and 2, there are many controlled components, such as the engine 11, the CVT 21, the MG 32, the battery 51, the brake 71, and the EPS 81, that are controlled by an ECU, in order to operate the hybrid vehicle. As a result, data recorded in an event of abnormality occurrence exists in many ECUs in a dispersed manner. In other words, even when the occurrence of the abnormality is detected in one of those ECUs, the recordation of the required data regarding the abnormality, without losing any of the required data, may be difficult at the time of the abnormality occurrence.

Figure 3:
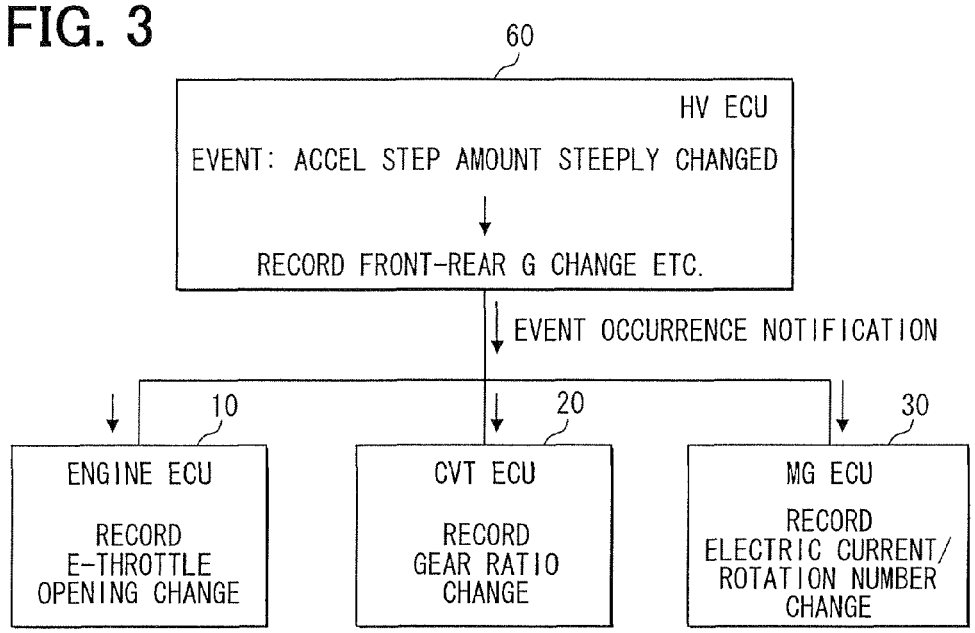
FIG. 3 is a block diagram of a data recording apparatus according to the present disclosure.

With reference now including FIG. 3, the data recording apparatus of the present embodiment is described. The HV ECU 60 detects a predetermined abnormal event, and, by way of example, the abnormal event is provided as a sudden change of the accelerator depression amount. Based on the detection of the abnormal event, each of the ECUs records the data regarding the system operation condition of the vehicle control system respectively held in those ECUs.

The data recording apparatus is applied and used in an in-vehicle control system having a plurality of ECUs that are operated in a cooperative manner and are in communication with each other. Each of the ECUs is equipped with a memory for recording data regarding the system operation condition of the vehicle control system. When the HV ECU detects a predetermined abnormal event (e.g., a steep change of the accelerator depression amount) occurring in any of the ECUs, the HV ECU 60 records, in a memory of the HV ECU 60, the data regarding the system operation condition of the vehicle control system (e.g., the change of the acceleration in a front-rear direction of the vehicle), which is held by the HV ECU 60. The HV ECU 60 also notifies the other ECUs, such as ECU 10, 20, 30, about the occurrence of the abnormal event. Upon receiving the notification of the abnormal event, the ECUs 10, 20, 30 respectively record the data regarding the system operation condition of the vehicle control system. For example, ENG ECU 10 may record the change of the opening of the electric throttle; CVT ECU 20 may record the change of the gear ratio; and MG ECU 30 may record the change of the electric current and the number of rotation in the MG 32.

Accordingly, when the data required to be recorded is distributed to the ECUs 10, 20, 30, 60, the required data is recorded at the time of the abnormal event in the individual ECU memory, and thus preventing the loss of required data. Furthermore, the data recording operation can be completed faster in comparison to the conventional operation scheme, in which a conventional ECU transmits the relevant data held in the ECU to a memory of one of multiple ECUs to have the relevant data recorded therein. Additionally, the ECU of the present disclosure reduces the amount of transmitted data in comparison to the conventional ECU.

Per the example provided in FIG. 3, the HV ECU 60 detects the occurrence of the abnormal event, and transmits the notification to the ECUs 10, 20, 30. However, the ECUs 10, 20, 30 may also detect respectively different abnormal events, and may transmit the notification to other ECUs at the time of detecting the abnormal event. In such a case, the abnormal event notification may be selectively transmitted to other ECUs, according to the type of the abnormal event detected by each of the ECUs. In other words, as a predetermined abnormal event, multiple types of abnormal events may be pre-selected, and, for each of the abnormal event, data type to be recorded may be pre-determined. In such manner, the ECU detecting the occurrence of a specific abnormal event may selectively send notification of such specific abnormal event only to one or more ECUs which hold the must-be-recorded data relevant to such specific abnormal event.

For example, when an abnormal vehicle behavior, such as an abrupt acceleration, an abrupt slowdown, a steep turn, or the like, is determined as a predetermined abnormal event in the vehicle control system, all of the control components in the vehicle control system and their respective ECUs may affect the vehicle behavior. Therefore, when an abnormal behavior of the vehicle occurs, each of the ECUs are notified of the occurrence of an abnormal event, so that data, such as a target value in each of the ECUs, a sensor detection value for the calculation of such target value, and/or a drive signal for controlling the control components, are recorded together with other data.

On the other hand, when operation abnormality of individual control components and abnormality of the target value in the controlling ECU for the control component are respectively determined as a predetermined event, all of the control components and controlling ECUs may not necessarily be affected by the occurrence of such event. Therefore, for the recording of data, the ECU that has detected the abnormal event transmits a notification only to the ECUs that holds data relevant to the occurrence of the abnormal event. In this manner, data regarding the operation abnormality of the individual components and abnormality of the target value in the controlling ECU are effectively and efficiently recorded for the investigation of the cause of such abnormality.

As described above, by defining the must-be-recorded data for each of the types of the abnormal events and by recording the must-be-recorded data only, the recordation of the relevant data at the time of abnormality occurrence is efficiently performed. As a result, data for the diagnosis of the entire system and data for the diagnosis of the individual component are acquired. In other words, the required data is collected without fail. For example, when the abrupt acceleration/braking and/or the steep turn are respectively defined as an event of abnormal vehicle behavior, and target values as well as sensor detection values and driving signals for controlling each of the ECUs related to the abnormal vehicle behavior are defined as predetermined data set or must-be-recorded-data of the "abnormal" event, a vehicle control system for controlling a hybrid vehicle may be enabled to record only the related data for the "abnormal" event from among the data in each of the ECUs.

Further, when occurrence of the predetermined abnormal event is notified to other ECUs through the vehicle LAN, the priority of the message to notify the occurrence of the predetermined abnormal event is set to the highest level, for enabling a quick transmission of such message. In such manner, the notification is transmitted to the other ECUs without delay, and the required data in the other ECU is recorded without fail. The notification of the abnormality may also be transmitted through a dedicated line that is installed beside the vehicle LAN.

The memory where each ECU records the must-be-recorded data for analysis is a nonvolatile memory, and such memory maintains the recorded data even when the ignition switch of the vehicle is turned off and the power supply for each ECU is stopped. Further, each ECU may record the data for analysis after memorizing such data temporarily in a volatile memory and may write the data in the volatile memory to the non-volatile memory at a suitable timing when, for example, the recordation in the volatile memory is finished, or when the ignition switch is turned off.

Further, the memory of each ECU may record data for a first scheduled time length, and each ECU writes data with an infinite loop to their respective memory at a regular interval, such as every second. Further, each ECU determines the occurrence of the abnormal event based on event occurrence determination data such as a sensor signal, a target value, or the like. When the occurrence of an abnormal event is determined, or when a notification of an occurrence of an abnormal event is received from another ECU, each ECU stops data recordation for a predetermined period of time after the receipt of the notification. As a result, pre-event data and post-event data are recorded in the memory of each ECU.

Data recorded in the memory of each ECU may include a sensor signal from a sensor that detects a driver's operation, because the operation by the vehicle driver affects the system operation condition of the vehicle control system. Such sensor may include an accelerator pedal sensor for detecting the depression amount of the accelerator pedal, a brake pedal sensor for detecting the depression amount of the brake pedal, a shift position sensor for detecting the shift position of the gearbox, and a steering sensor for detecting a steering angle of a steering wheel. Further, data recorded in the memory of each ECU may include a signal of a sensor detecting the behavior of the vehicle, which changes according to the control of the vehicle control system. Such sensor may include a speed sensor for detecting the travel speed of the vehicle, an acceleration sensor for detecting acceleration of the vehicle in a front-rear direction of the vehicle and in a right-left direction of the vehicle, a yaw rate sensor for detecting an acceleration in a rotation direction (i.e., right-left turn direction) of the vehicle and the like.

Further, the following data may be recorded: the temperature of the engine 11, the MG 32 and the battery 51; the electric current value and the number of rotations of the MG 32; the SOC and SOH of the battery 51; the fluid pressure of the brake system may be recorded in the memory; and/or the like. Furthermore, the target value and the control signal of various control systems of the hybrid vehicle may also be included in the data recorded in the memory. For example, the target value and the control signal of the electric power steering control system, the brake control system, the CVT control system, and the engine control system may be included. According to the target value and the control signal of the selected control systems, an assist power of the EPS 81, a brake power of the BRK 71, a gear ratio of the CVT 21, a torque of the engine 11 may be changed.

Further, event information indicative of the occurrence of the abnormal event is recorded in the memory of each ECU, in addition to the data regarding the system operation condition of the vehicle control system. By recording such information, post-event abnormality diagnosis based on the recorded data is performed, in terms of analyzing and recognizing which data corresponds to which abnormal event. Further, the event information is utilized to determine a relationship between data pieces recorded individually in the memories of different ECUs.

However, even when the event information is recorded, the relationship between the recorded data may become unclear if the same abnormal events occurred successively. Therefore, in the vehicular data recording apparatus time information regarding the moment of recording the data is also recorded in the memory. In such manner, the memory of each ECU can establish the relationship between recorded data securely and clearly.

Figure 4:
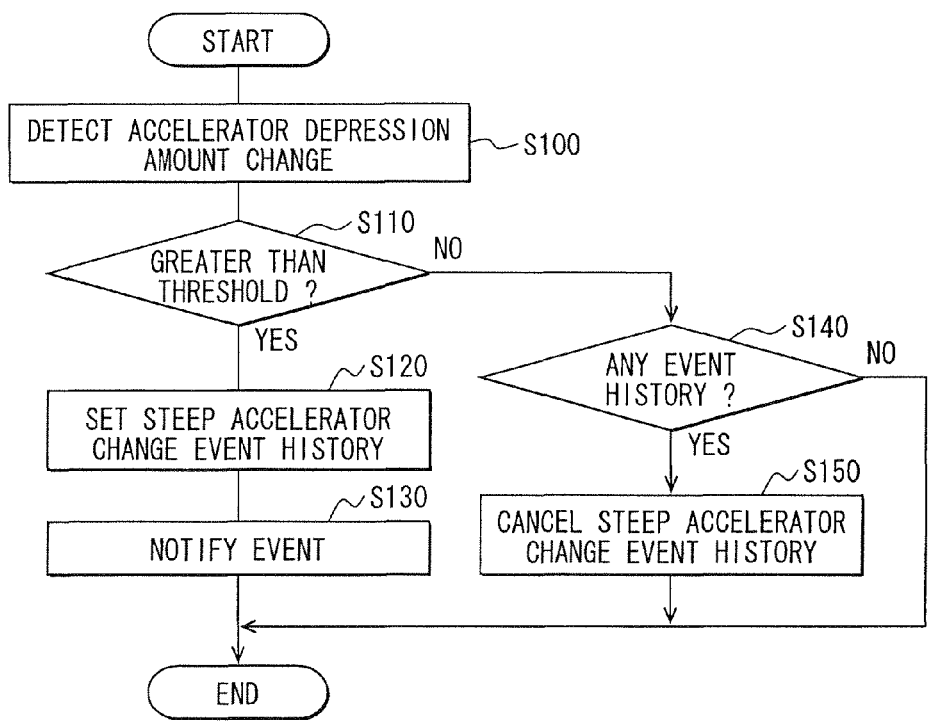
FIG. 4 is a flowchart of a data recording process for a portion that handles abnormal event detection and event history management.
Figure 5:
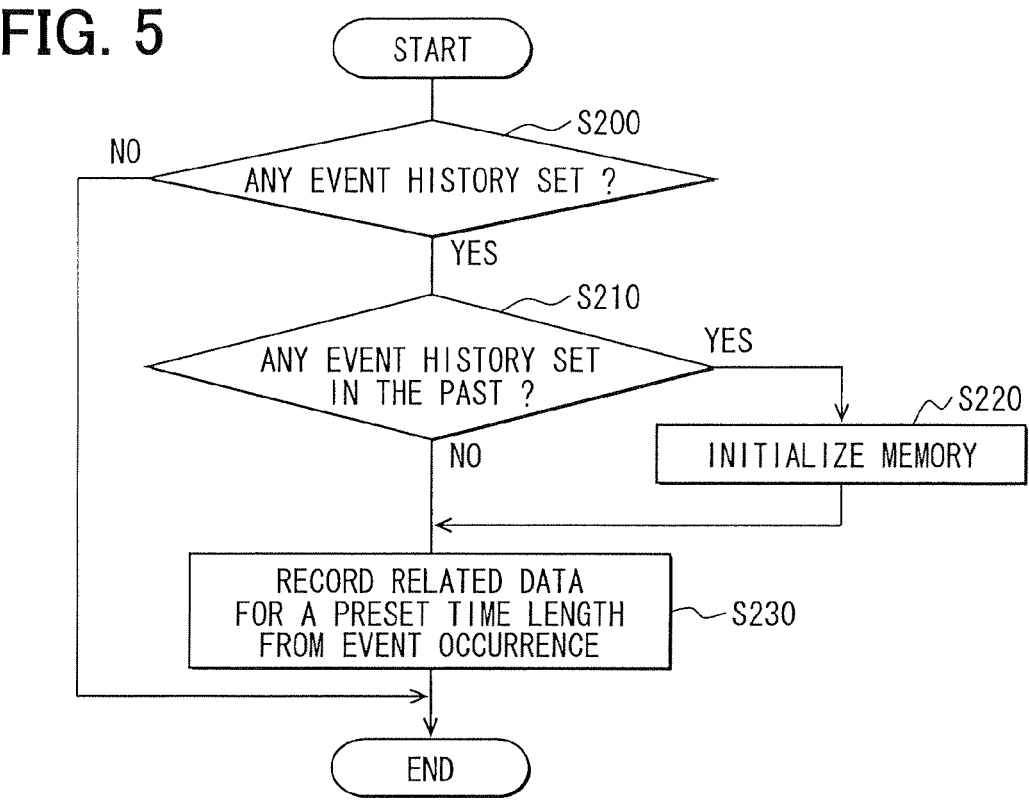
FIG. 5 is a flowchart of a data recording process in a detecting ECU that has detected an abnormal event.
Figure 6:
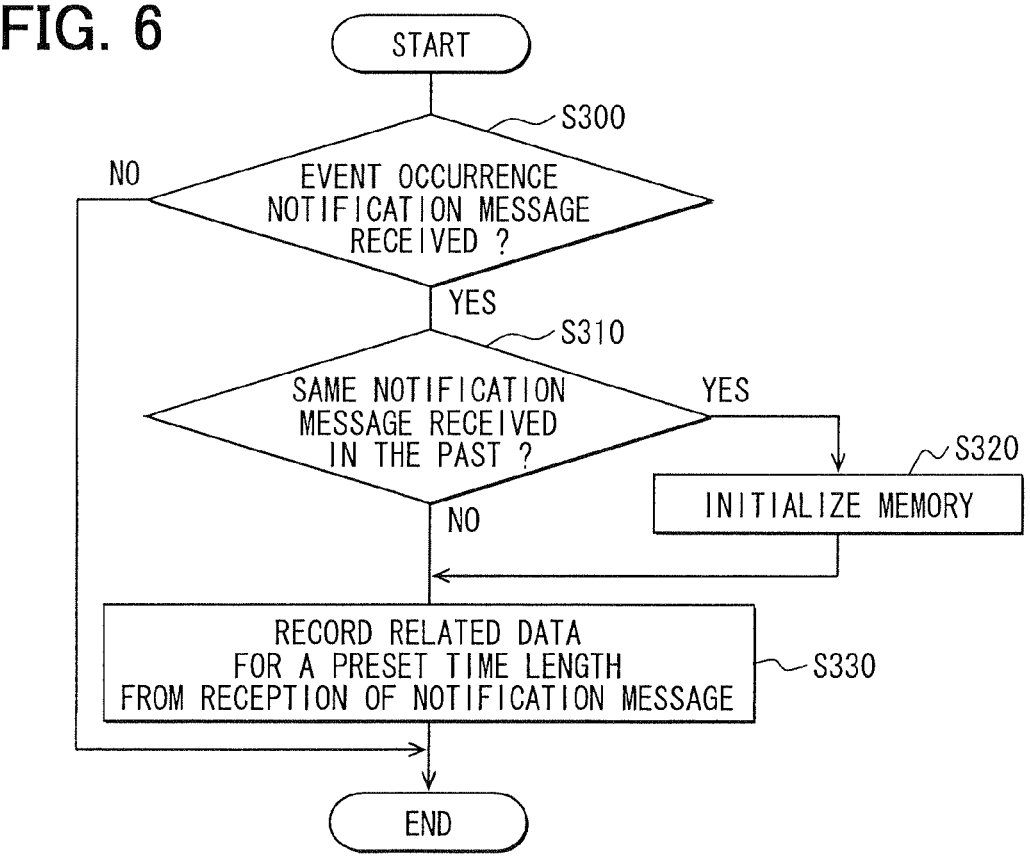
FIG. 6 is a flowchart of a data recording process in other ECUs that have received notification from the detecting ECU.

A recording process performed in the vehicular data recording apparatus to record data at a time of occurrence of an abnormal event regarding the present embodiment is explained in detail with reference to FIGS. 4 to 6. By way of example, the abnormal event is provided as a steep change of the accelerator depression amount. FIGS. 4 and 5 depict a process performed by the HV ECU 60, and FIG. 6 depicts a process performed by the other ECUs that have received notification from the HV ECU 60. The processes described below are performed when the ignition of the vehicle is turned on, and are repeated at regular interval afterwards.

With reference now including FIG. 4, the process, in S100, detects a change of the accelerator depression amount per unit time, and in S110, determines whether the change in the accelerator depression amount is greater than a predetermined threshold. When the change in the accelerator depression amount is greater than the threshold, the process, in S120, sets or records the steep change of the accelerator depression amount as an "event" in the an event history, which assumes that an abnormal event occurred to cause a steep change of the accelerator depression amount. The process, in S130, notifies the occurrence of the abnormal event to the ECUs that may contain data relevant to the abnormal event during the time the abnormal event occurred, and instructs the ECUs to record such data.

Alternatively, when the change in the accelerator depression amount is not greater than the threshold, the process, in S140, determines whether the steep accelerator change event was recorded previously. If the steep accelerator change event was previously recorded (S140:YES), the process, in step S150, clears or removes the previous steep accelerator change event from the event history, so that the steep accelerator change event can be newly recorded by the recording process at a time of next occurrence.

With reference now including FIG. 5, the process, in S200, determines whether the steep accelerator change event has been set in the event history. When the event has not been set (S200:NO), the process ends. When the event has been set (S200:YES), the process, in S210, determines whether the steep accelerator change event was previously recorded, and whether the recorded data still exists in the memory. When the event is available in the memory, the process, in S220, clears the previous data of the abnormal event and initializes the memory. The process ensures that only the data regarding the latest occurrence of the abnormal event is recorded when the same abnormal event has occurred at least twice. However, if sufficient capacity is available in the memory, the data of the latest occurrence of the abnormal event may be recorded without erasing the data of the past occurrences of the abnormal event.

When the event is not available in the memory (S210:NO) or when the memory is initialized (after S220), the process, in S230, records related data for a preset period of time. Specifically, by using an event occurrence time as a reference point of time, data for a predetermined period of time before the reference point (i.e. a first scheduled time length) and data for a predetermined period of time after the reference point (i.e. a second schedule time length) is recorded in the memory. In such a case, the type of the abnormal event and time information indicative of the occurrence time of the abnormal event just occurred are also recorded in the memory.

With reference now including FIG. 6, the process, in S300, which is performed by the other ECUs, determine whether a notification message of an abnormal event occurrence has been received. When no such notification is available (S300:NO), the process ends, and is later repeated, as discussed earlier. When a notification of an abnormal event is received (S300:YES), the process, in S310, determines whether a notification message that notifies that an abnormal event of the same kind has occurred was previously received. If such notification was previously received (S310:Yes), which indicates that the data of such notification message exists in the memory, the process, in S320, initializes the memory by clearing the memory of such data. However, if sufficient capacity is available in the memory, data of the past notification message may be kept, and data of a new notification message may also be recorded.

When the past notification is not available in the memory (S310:NO) or when the memory is initialized (after S320), the process, in S330, records related data for a predetermined period of time from the reception of the notification. That is, by using a reception time of an event notification message as a reference point of time, data for a predetermined period of time before the reference point (i.e. the first scheduled time length) and data for a predetermined period of time after the reference point (i.e. the second scheduled time length) is recorded in the memory. In such a case, the notification message indicative of the type of the abnormal event and time information indicative of the reception time of the notification message are also recorded in the memory.

The example explained above is in regards to the recordation of data in the detecting ECU and other ECUs at the time when the occurrence of an abnormal event is detected in the detecting ECU. It is also possible for multiple abnormal events to occur substantially at the same time. Therefore, for coping with such a situation, each ECUs may have a memory whose capacity is capable of recording data of all of the multiple abnormal events.

Further, in the example mentioned above, the message indicative of the type of the abnormal event that just occurred is transmitted from the detecting ECU to the relevant ECUs that are material to the abnormal event that just occurred. The message may include time information about the abnormal event occurrence time, or about time of generating such message (i.e., notification message for notifying the occurrence of the abnormal event). Based on the time information included in the received message the ECUs receiving such message may determine the time period for recording the data. In this manner, even when the delivery of such message is delayed, the delay of the message delivery is recognized in each of the receiving ECUs, and the recordation of the data in each of the receiving ECUs is retroactively performed, by taking into account of delay of the message delivery. Therefore, without regard to the delay of the message delivery, the detecting ECU and the receiving ECU are enabled to record the data of substantially the same time period (i.e., between the same start time and the same end time) about a certain abnormal event. Further, by controlling the memory in each of the ECUs to record the time information in the message, the relationship between the recorded data in the memory of respective ECUs is more clearly recognized and analyzed.

Further, when the ECUs are able to use a dedicated communication line to communicate with each other, the dedicated communication line may be designed such that it can only be used to notify the occurrence of the abnormal event, and the type of the abnormal event may be provided through the vehicle LAN afterwards. In such a case, the dedicated communication line may only be capable of distinguishing an abnormality occurring and notifying condition from an abnormality non-occurring condition. In other words, the dedicated communication line may only be capable of sending an ON signal and an OFF signal. By adopting such configuration, the communication delay due to the vehicle LAN may be securely avoided, and delay of notification of occurrence of the abnormal event may be minimized.

Further, when only the occurrence of the abnormal event is notified, each of the receiving ECUs may temporarily record all the data that might possibly be related to the abnormal event, until the type of the abnormal event is provided. When all of the required data needs to be continuously recorded, the memory capacity for recording the data needs to be very large. However, according to the above-mentioned configuration, the detecting ECU that has transmitted the notification of occurrence of the abnormal event will also transmit information of the type of the abnormal event through the vehicle LAN to each of the relevant ECUs. Such notification of the abnormal event type may not have a high communication priority, thereby affecting an inter-ECU communication for the cooperative ECU operation only lightly. Therefore, after the reception of the abnormal event type in each of the relevant ECUs, the amount of the relevant data to be recoded in the memory in each of the ECUs is greatly reduced.

A data output process for outputting the data from the memory of each of the ECUs to a diagnosis apparatus is explained in the following.

Figure 7:
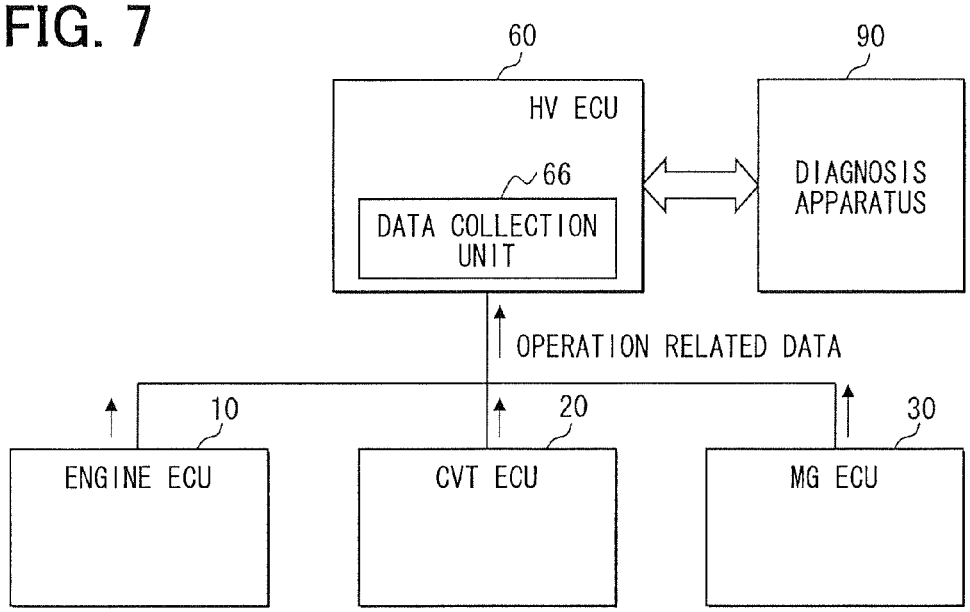
FIG. 7 is a block diagram of a data output method to an external diagnosis apparatus according to the present disclosure.

With reference now including FIG. 7, when a diagnosis apparatus 90 is externally coupled to the vehicular data recording apparatus, the data recorded in the memory of each of the ECUs is outputted to the diagnosis device 90. Based on the data retrieved from the vehicular data recording apparatus, the diagnosis apparatus 90 analyzes the system operation condition of the vehicle control system at the time the abnormal event occurred, and diagnoses a cause of the abnormality.

When data recorded in the memory of each of the ECUs is outputted to the diagnosis apparatus 90 the HV ECU 60 may use a data collection unit 66 for collecting the data from the memory of each of the ECUs and compiling the collected data before outputting the data to the diagnosis apparatus 90. Therefore, even when the recoded data is dispersedly distributed in the ECUs, all of the required data are successfully outputted to the diagnosis apparatus 90.

The collection of the recorded data by the data collection unit 66 may be performed in advance before the diagnosis apparatus 90 is coupled to the vehicular data recording apparatus, or at the time of coupling the diagnosis apparatus 90 to the vehicular data recording apparatus.

If the collection of the recorded data is performed in advance, the data collection unit 66 may preferably collect the data when the data communication load between multiple ECUs for the vehicle control is smaller than a certain threshold. By collecting the data during a low communication load time, the communication for in-advance collecting of the data that is provided for the diagnosis apparatus 90 is performed without affecting a primary communication for performing the vehicle control.

On the other hand, if the data collection unit 66 collects data from each ECU when the diagnosis apparatus 90 is coupled to the vehicular data recording apparatus, a command to instruct the data which should be collected may be received from the diagnosis apparatus 90, and the data may be collected from each ECU according to such instruction command. In this manner, the data requested from the diagnosis apparatus 90 is collected effectively for the output to the diagnosis apparatus 90.

Figure 8:
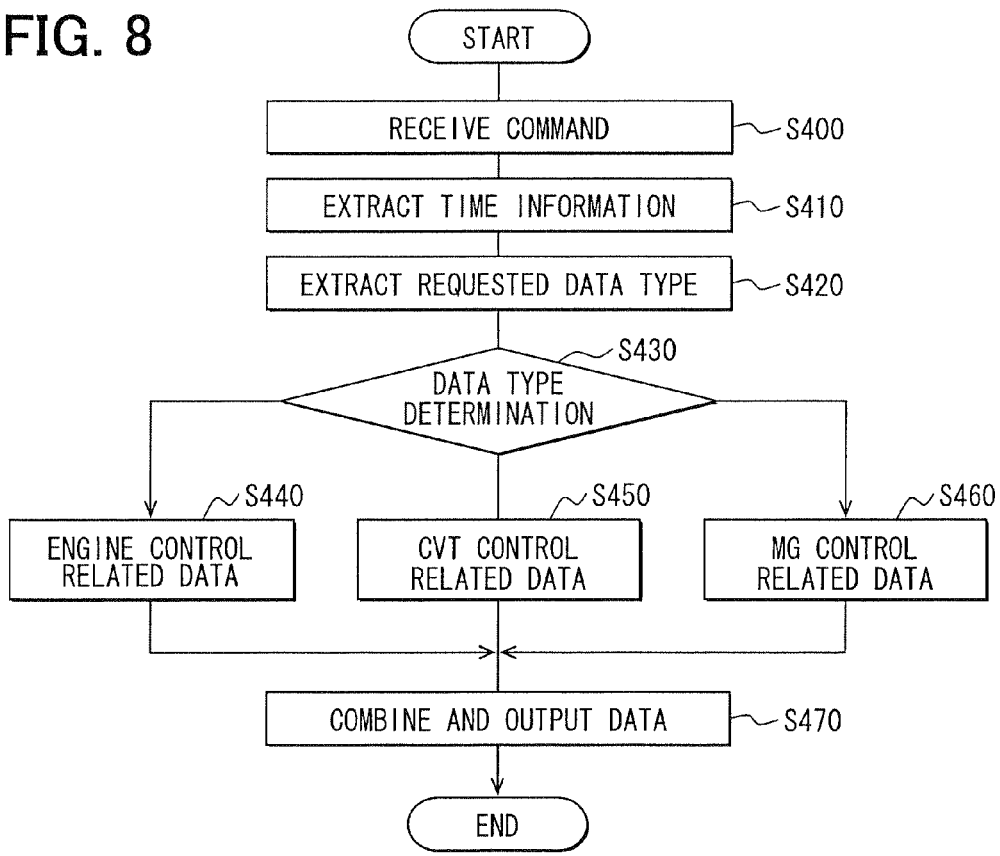
FIG. 8 is a flowchart of a data output process for the external diagnosis apparatus of FIG. 7.

With reference now including FIG. 8, a process for outputting the instructed data from the data collection unit 66 of the HV ECU 60, in response to a command that is received from the diagnosis apparatus 90 is described.

The process, in S400, receives a command output from the diagnosis apparatus 90. The command may provide time information to indicate a time condition that designates data recording time and type information to indicate a type of the requested data. This allows the diagnosis apparatus 90 to request desired data only.

The type information that indicates the type of the requested data may specify an abnormal event, for requesting the output of the data that is recorded based on the occurrence of the abnormal event, or it may specify an abnormal event detected by a specific ECU, for requesting the output of the data recorded at the time of abnormal event detection by such ECU.

The process, in S410 and S420, extracts the time information and the type information, respectively, from the command. Further, in S430, data that matches the time information and the type information is determined. When the matching data is recorded in the engine ECU 10, the process proceeds to S440 to instruct the engine ECU 10 to output the relevant engine control data. In other words, instead of instructing to output all the data related to the engine control, the instruction to the engine ECU 10 asks to limit the output data only to the requested data that is requested by the diagnosis apparatus 90.

Similarly, when the data matching with the time information and the type information in the command is recorded in the in CVT ECU 20, the process, in S450, instructs the CVT ECU 20 to output the relevant CVT control data. When the relevant data is recorded in the MG ECU 30, the process, in S460, instructs the MG ECU 30 to output the relevant MG control data. In this case, if it is necessary, the data collection unit 66 may instruct the other ECUs to output relevant control data.

In S470, the data collection unit outputs the data collected from each ECU to the diagnosis apparatus 90 after, compiling the data for each one of the abnormal events.

Therefore, the vehicular data recording apparatus outputs the data according to the command from the diagnosis apparatus 90, thereby enabling the diagnosis apparatus 90 to perform abnormality diagnosis, such as an entire vehicular control system abnormality diagnosis or an abnormality diagnosis of each of the individual ECUs and/or control components. In other words, an object of abnormality diagnosis can arbitrarily and selectively be set by the diagnosis apparatus 90.

Although the present disclosure has been fully described in connection with the present embodiment thereof with reference to the accompanying drawings, it is to be noted that various changes and modifications will become apparent to those skilled in the art.

In an example of the above-described embodiment, the data collection unit 66 is disposed in the HV ECU 60, and the diagnosis apparatus 90 acquires required data from the HV ECU 60. However, various modifications for the above setting are possible. That is, for example, even when the diagnosis apparatus 90 is configured to communicate with the HV ECU 60, the data collection unit 66 may be disposed in other ECUs that are different from the HV ECU 60. Further, when one of a plurality of data collection units 66, which are disposed in the HV ECU 60 and the other ECUs, is broken, the required data may be collected by the functioning data collection units of the other ECUs. Furthermore, the data collection unit for collecting data from the memory of each of the ECUs and for performing communication with the diagnosis apparatus 90 may be disposed in a dedicated ECU, which is different from the ECUs that constitute the vehicle control system.

Furthermore, instead of compiling, bundling and outputting the data by the data collection unit 66 after collecting the recorded data from each of the ECUs and before outputting the data to the diagnosis apparatus 90, the recorded data may be output by each ECU to the diagnosis apparatus 90. Such data output scheme may also enable the output of all of the recorded data from the memory of each of the multiple ECUs to the external diagnosis apparatus 90 without fail.

Such changes, modifications, and summarized schemes are to be understood as being within the scope of the present disclosure as defined by appended claims.

What is claimed is:

1. A vehicular data recording apparatus for recording, at a time of occurrence of a certain event, a system operation condition data that is related to a system operation condition of a vehicle control system that controls a vehicle, the apparatus comprising:

a recorder in each of a plurality of electronic control units (ECUs) in the vehicle control system in which each ECU stores data in their respective recorder, the ECUs are communicably coupled to each other, wherein when at least one of the ECUs detects an occurrence of an event, a detecting ECU that detected the occurrence of the event records a data held by the detecting ECU that is related to the system operation condition of the vehicle control system in the recorder of the detecting ECU, and the detecting ECU notifies the remaining ECUs of the occurrence of the event, and each of the remaining ECUs, respectively, at least records a data held by the remaining ECUs that is related to the system operation condition of the vehicle control system in their respective recorder, wherein the data recorded in the vehicular data recording apparatus is output to an external diagnosis device, output of the recorded data to the external diagnosis device is performed (a) after data collection from the recorder in the each of the ECUs by one of the ECUs, or (b) after data collection from the recorder in each of the ECUs by a dedicated ECU for collecting the data, and collection of the data is performed by one of the ECUs or the dedicated ECU when communication load for data exchange that is required for vehicle control among the ECUs is lower than a threshold.

2. The vehicular data recording apparatus of claim 1, wherein a predetermined event has pre-selected events and the pre-selected events have a pre-determined data type to be recorded.

3. The vehicular data recording apparatus of claim 2, wherein when an occurrence of the predetermined event is detected, notification of the occurrence of the predetermined event is communicated before other communications.

4. The vehicular data recording apparatus of claim 1, wherein the detecting ECU notifies only the ECUs holding data relevant to the occurrence of the event.

5. The vehicular data recording apparatus of claim 1, wherein the ECUs record data for a first scheduled time length and infinitely write data at regular intervals.

6. The vehicular data recording apparatus of claim 1, wherein each of the ECUs use the time information to record data from substantially the same time period.

7. The vehicular data recording apparatus of claim 1, further comprising:
a communication line connecting the ECUs wherein the communication line only communicates notice of the occurrence of the event and information regarding the type of event.

8. The vehicular data recording apparatus of claim 1, wherein notice of the occurrence of the event is communicated before information regarding the type of event.

9. A vehicular data recording apparatus for recording, at a time of occurrence of a certain event, a system operation condition data that is related to a system operation condition of a vehicle control system that controls a vehicle, the apparatus comprising:

a recorder in each of a plurality of electronic control units (ECUs) in the vehicle control system in which each ECU stores data in their respective recorder, the ECUs are communicably coupled to each other, wherein when at least one of the ECUs detects an occurrence of an event, a detecting ECU that detected the occurrence of the event records a data held by the detecting ECU that is related to the system operation condition of the vehicle control system in the recorder of the detecting ECU, and the detecting ECU notifies the remaining ECUs of the occurrence of the event, and each of the remaining ECUs, respectively, at least records a data held by the remaining ECUs that is related to the system operation condition of the vehicle control system in their respective recorder, wherein the data recorded in the vehicular data recording apparatus is output to an external diagnosis device, output of the recorded data to the external diagnosis device is performed (a) after data collection from the recorder in the each of the ECUs by one of the ECUs, or (b) after data collection from the recorder in each of the ECUs by a dedicated ECU for collecting the data, collection of the data is performed by one of the ECUs or by the dedicated ECU upon receiving a command that specifies the data to be collected, and one of the ECUs or the dedicated ECU collects the data from the ECUs according to the received command.

10. A vehicular data recording apparatus for recording, at a time of occurrence of a certain event, a system operation condition data that is related to a system operation condition of a vehicle control system that controls a vehicle, the apparatus comprising:

a recorder in each of a plurality of electronic control units (ECUs) in the vehicle control system in which each ECU stores data in their respective recorder, the ECUs are communicably coupled to each other, wherein when at least one of the ECUs detects an occurrence of an event, a detecting ECU that detected the occurrence of the event records a data held by the detecting ECU that is related to the system operation condition of the vehicle control system in the recorder of the detecting ECU, the detecting ECU notifies the remaining ECUs of the occurrence of the event, and each of the remaining ECUs, respectively, at least records a data held by the remaining ECUs that is related to the system operation condition of the vehicle control system in their respective recorder, and the data recorded in the vehicular data recording apparatus is output to an external diagnosis device, and output of the recorded data is performed by turns from the recorder in each of the ECUs to the external diagnosis device.

* * * * *